W. E. BUDD.
WHEEL TIRE.
APPLICATION FILED SEPT. 13, 1913.
1,088,768.
Patented Mar. 3, 1914.
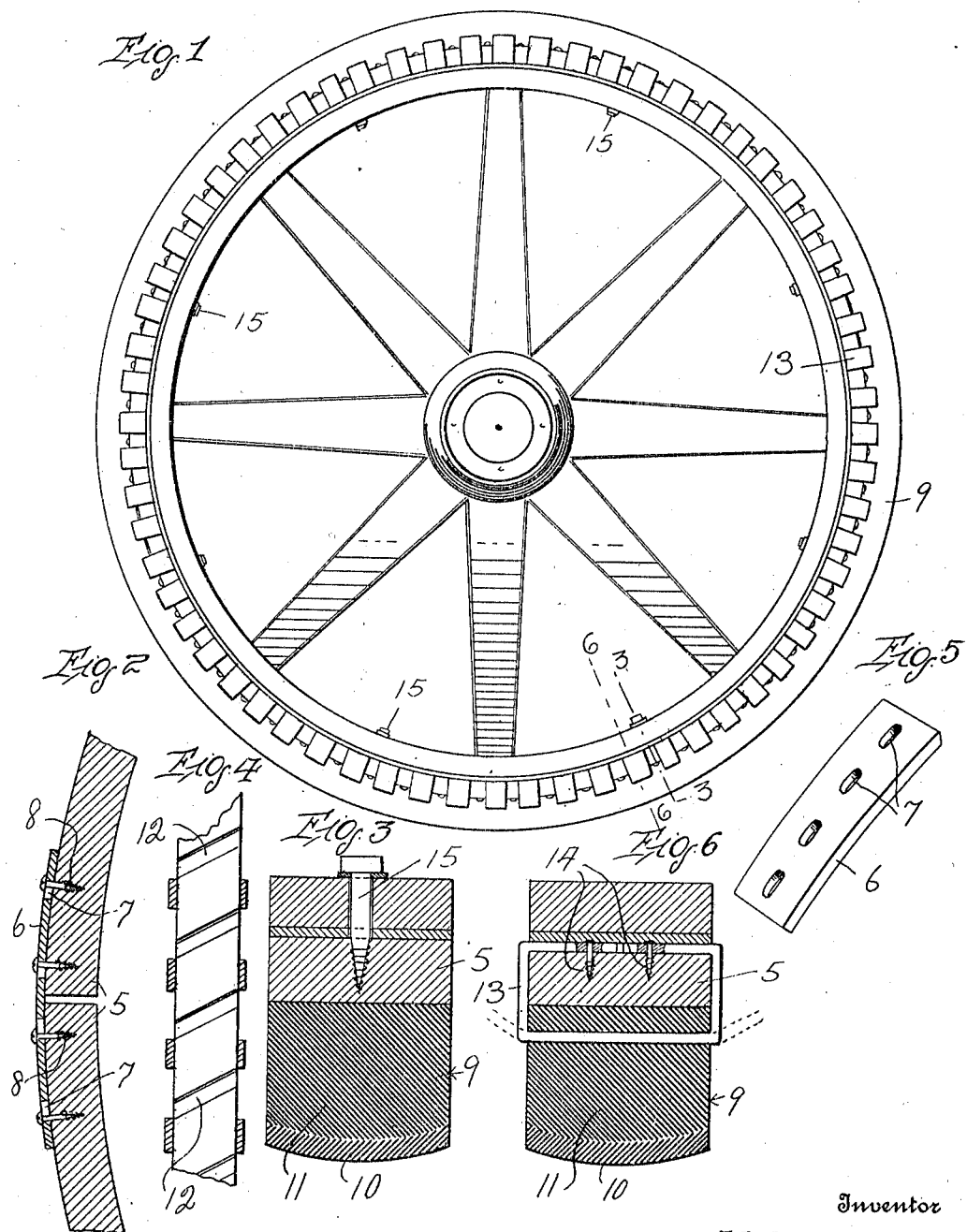
Inventor
W. E. BUDD

UNITED STATES PATENT OFFICE.

WILLIAM E. BUDD, OF ELIZABETH, NEW JERSEY.

WHEEL-TIRE.

1,088,768.   Specification of Letters Patent.   Patented Mar. 3, 1914.

Application filed September 13, 1913.   Serial No. 789,693.

*To all whom it may concern:*

Be it known that I, WILLIAM E. BUDD, citizen of the United States, residing at Elizabeth, in the county of Union and State of New Jersey, have invented certain new and useful Improvements in Wheel-Tires, of which the following is a specification, reference being had to the accompanying drawings.

This invention relates to vehicle tires and more particularly to tires of that character designed to be employed upon the wheels of automobiles, or other motor driven vehicles, the invention having for its primary object to provide a simple, efficient and inexpensive substitute for the pneumatic tire now in general use.

Another and more specific object of the invention resides in the provision of a tire embodying a wood or other non-yieldable base upon which the pliable tire body is built and secured.

My invention further contemplates the provision of a tire having a base consisting of two substantially semicircular wood sections, and means for connecting said sections whereby their relative movement is permitted, thereby greatly facilitating their application to the rim or felly of a wheel.

It is another and more specific object of the invention to provide a tire body built up of a plurality of laminated layers of rubber vulcanized or otherwise secured together, a base upon which the tire body is cemented, and fastening means to secure the tire body upon the base extending transversely through said body and forming what is in effect a component part thereof.

My invention still further comprehends the provision of a tire of the demountable type which is so constructed as to render the same extremely resilient or pliable in actual use whereby all shocks or jars which would otherwise be transmitted to the body of the vehicle are absorbed, the risk incident to the use of the ordinary pneumatic tire being entirely overcome.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a wheel provided with my improved tire; Fig. 2 is an enlarged longitudinal section illustrating the manner of connecting the base sections at their ends; Fig. 3 is a transverse section taken on the line 3—3 of Fig. 1; Fig. 4 is a detail inner face view of the rubber body of the tire; Fig. 5 is a detail perspective view of the steel connecting plate between the tire sections. Fig. 6 is a detail section on the line 6—6 of Fig. 1.

Referring in detail to the drawing, 5 designates the base sections of the tire which are each of substantially semi-circular form and preferably constructed of wood or other comparatively non-yielding material. These tire sections have limited relative movement so that they may be readily slipped upon the peripheral face of a wheel rim or felly. Such movement of the tire sections is limited by the steel plates 6. One of the plates 6 connects the adjacent opposed ends of the base sections 5 and each end of said plate is provided with spaced elongated openings 7 to accommodate the shanks of the screws 8 which are threaded in said base members. It is of course understood that such screws effectively limit the movement of the tire sections toward or from each other.

Upon the base sections 5, a continuous annular tire body 9 is cemented or otherwise permanently secured. This body is preferably made up of two or more laminated layers, the outer or tread layer indicated at 10 being formed of tough rubber while the comparatively thick inner layer 11 is of soft rubber of a cheaper grade whereby the cost of production of such tires may be materially reduced. These rubber layers are vulcanized or fused together so that they constitute in effect a homogeneous body. The inner or soft layer of rubber engages directly upon the outer faces of the base members 5 and is provided with a plurality of spaced angularly extending grooves or arches 12 which form air pockets and greatly aid in preventing overheating and consequent deterioration in the pliability of the rubber tire body. As an additional means for securing the tire body to the base member 5, I provide straps of leather or other tough material 13, which may be embodied in said tire body when the same is molded, and extend transversely therethrough. The ends of these straps extend inwardly upon opposite sides of the base sections 5 and upon the inner face thereof to which they are securely fastened by means of the screws 14.

From the foregoing, it is believed that the construction of my improved tire will be clearly understood. In assembling the tire upon the rim of a wheel, the base members are separated as far as possible and inserted over the wheel felly. The annular rubber tire body has sufficient elasticity to readily permit of this separation of the base members. Each base member is then securely and rigidly held upon the felly by means of a plurality of lag screws 15, which are mounted in the wheel felly and threaded into the wood base members 5. By means of these screws, the base members of the tire are drawn into frictional clamping engagement upon the periphery of the wheel felly and securely held against relative movement. The provision of the air pockets 12 in the face of the inner soft rubber layer 11 greatly adds to the pliability of the tire body. As the wheel revolves, the body is compressed and the air successively forced from the pockets 12. When relieved of the weight of the vehicle, the air pockets are automatically resupplied with air and the rubber body quickly cooled. The tire is adapted to be constructed in regular standard sizes for automobiles, motorcycles and similar vehicles, and by the provision of the slotted steel connecting plates between the base sections, it will be obvious that my improved tire may be easily and quickly applied to or removed from the wheel felly.

While I have above described and illustrated in the accompanying drawing the preferred construction and arrangement of the several elements employed, it is to be understood that the invention is nevertheless susceptible of considerable modification therein and I therefore reserve the right to resort to all such legitimate changes as may be fairly embodied within the spirit and scope of the invention, as claimed.

Having thus described the invention, what is claimed is:

A tire including two similar non-yielding base members, a continuous pliable body permanently secured upon said base members, slotted steel plates extending upon the opposed ends of the base members, and screws threaded in said base members and disposed in the slots of said plates to limit the relative movement of said members.

In testimony whereof I hereunto affix my signature in the presence of two witnesses.

WILLIAM E. BUDD.

Witnesses:
D. W. GALL,
M. C. LYDDANE.